March 1, 1949.                B. ULRICH, JR                2,463,005
          OSCILLATING PISTON MOTOR MECHANISM WITH PISTON
                  SNAP ACTUATED DISTRIBUTING VALVES
                       Filed Jan. 5, 1945

INVENTOR.
BERNHARD ULRICH, JR.
BY Cecil E Arens
ATTORNEY

Patented Mar. 1, 1949

2,463,005

UNITED STATES PATENT OFFICE 2,463,005

OSCILLATING PISTON MOTOR MECHANISM WITH PISTON SNAP ACTUATED DISTRIBUTING VALVES

Bernhard Ulrich, Jr., South Bend, Ind., assignor to Bendix Aviation Corporation, South Bend, Ind., a corporation of Delaware Application January 5, 1945, Serial No. 571,464

2 Claims. (Cl. 121—97)

This invention relates to hydraulically operated devices and more particularly to hydraulically actuated windshield wipers for vehicles. The device of the invention is adapted to operate directly from pump pressure or from accumulator pressure.

It is an object of the invention to provide a fluid motor mechanism having means effective to mechanically maintain the motor in a predetermined locked position.

A further object of the invention is to provide a hydraulically actuated motor mechanism provided with means for effecting a change in speed of the motor.

A further object lies in the provision of an improved hydraulically actuated motor having valves responsive to the oscillating action of the motor for reversing the direction of said motor.

The above and other objects and features of the invention will be apparent from the description of the device illustrated in the accompanying drawings, in which.

Figure 1:
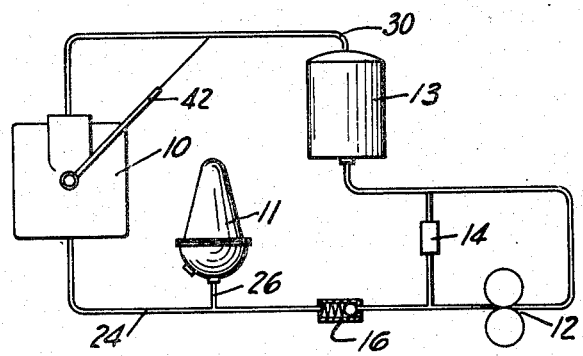
Figure 1 is a diagrammatic representation of a hydraulic system incorporating my invention.

Referring now to Figure 1 of the drawing, the reference numeral 10 indicates the device of the invention which is connected to an accumulator 11 which stores fluid under a predetermined pressure. A pump 12 connected to the vehicle engine, not shown, puts the fluid under pressure in the accumulator 11 for driving the windshield wiping mechanism 10 after which the fluid is exhausted for return to a reservoir 13. An unloading valve 14 is connected in parallel with the pump to by-pass fluid pressure at a time when the system pressure has reached a predetermined value. During the by-passing period the pump merely circulates the fluid through the unloading valve. A check valve 16 is connected to the system between the pump and accumulator to close the system and to prevent leakage of the fluid past the pump when the unloading valve is by-passing fluid to the reservoir.

The wiper motor 10 comprises a pair of body members 17 and 18 having a cylindrical ring-like member or housing 19 of wear resistant material interposed therebetween, the assembly being secured together in any suitable manner such as by screws or bolts, not shown. The motor 10 is provided with an inlet 22 connected to the accumulator 11 through conduits 24 and 26 and an outlet 28 connected to the reservoir 13 through conduit 30. A shaft 32 has fixed thereto in any suitable manner as by a bolt 34 an oscillating member 36 mounted within housing 19 and having sides 37 and 38 which are subjected to the pressures in chambers 40 and 41. The differential between these pressures acting on opposite sides of the oscillating member causes the same to drive the shaft 32 to which is connected a wiper blade 42. Disposed in the housing 19 are double-acting inlet and exhaust valve members 46 and 48 respectively for admitting fluid pressure to one side of said oscillating member and for exhausting fluid pressure from the other side thereof to thereby oscillate said member periodically. Seals 49 are disposed in the housing 19 for sealing the chambers from atmosphere. The valves are arranged in a block 50 which is securely held to the housing by a bolt 52. The block 50 is properly fitted to the shaft 32 and housing 19 to preclude communication between the chambers 40 and 41 on opposite sides of the oscillating member. The block is drilled at 54 and 56 to receive bushings 58 and 60 provided with valve seats 58a, 58b and 60a, 60b for the inlet and outlet valves respectively. The valves 46 and 48 are adapted to be actuated in response to movement of the oscillating member as it approaches the ends of its periods of oscillation.

The inlet pressure is initially admitted to one or the other of chambers 40 and 41, depending on the position of valve 46 with respect to the valve seats 58a and 58b. The inlet pressure is admitted through the inlet 22, passages 62, 64 and 66. The passage 66 terminates adjacent the inlet valve 46 which is adapted to reciprocate to alternately connect first one of the chambers and then the other chamber to the inlet through passages 68 and 70. The chambers are exhausted of fluid pressure through passages 72 or 74 depending on the position of valve 48 with respect to the seats 60a and 60b. Fluid pressure exhausted from the chambers 40 and 41 is communicated to the outlet through passage 76.

The oscillating member 36 is equipped with a pair of valve actuating members 80. The valve actuating members are engaged by springs 82 to render said members yieldable with respect to the oscillating member 36. A pair of spring-urged balls 84 are disposed in the path of movement of said valve actuating members so that said members will yield on initial engagement of the balls, but as soon as the force of the springs 82 has reached a predetermined value the balls 84 will be displaced to thereby release the valve actuating members for engaging the valves 46 and 48 to actuate the same. This detent arrangement for actuating the valves provides a snap action which guarantees positive opening and closing of the valve and eliminates the possibility of only cracking the valves to admit or exhaust, as the case may be, of a part only of the fluid pressure. This latter condition is of course objectionable because under these conditions one side of the oscillating member would not be exposed to full operating pressure and the other side would not be wide open for exhausting the fluid unhampered.

Figure 2:
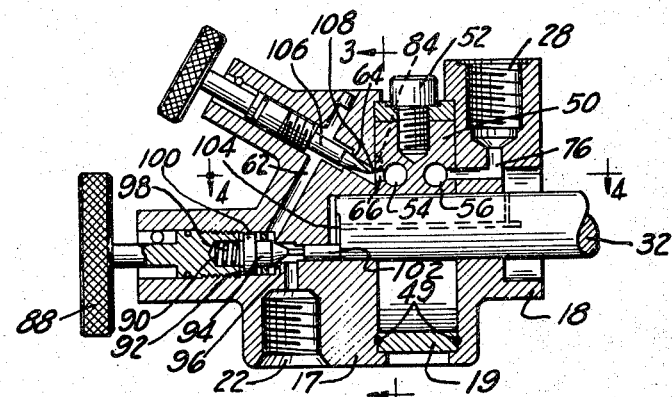
Figure 2 is a longitudinal section, partly in elevation, illustrating a fluid actuated motor mechanism constructed in accordance with the present invention.
Figure 4:
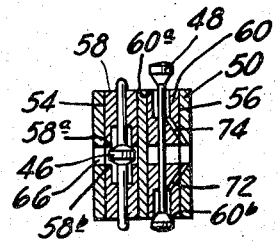
Figure 4 is an enlarged section taken substantially on the line 4—4 of Figure 2 illustrating the valving arrangement.
Figure 3:
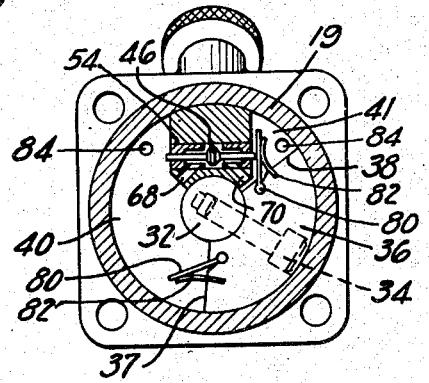
Figure 3 is a transverse section, partly in elevation, taken substantially on the line 3—3 of the device shown in Figure 2.

A control valve 88 is drilled longitudinally at 90 and transversely at 92. The control valve comprises a valve pin 94 which slides in the longitudinal bore 90. The valve pin is adapted to cooperate with a valve seat 96 for controlling the fluid pressure from the inlet 22 through passage 62 to the sides of the oscillating member. A spring 98 of the control valve urges the pin 94 to a valve closing position as shown in Figure 2. A transverse pin 100, which is smaller in diameter than the bore 92, passes through the valve pin 94 to restrict the axial movement thereof. A valve pin extension 102 is integrally connected to the valve pin 94 and is adapted to engage a slotted portion 104 of the shaft 32 when it is desired to stop or park the wiping mechanism in a predetermined position. The transverse bore 92 is enough larger than the transverse pin 100 to allow for axial movement of the valve pin with respect to the valve part 88 when the valve is turned to a position tending to close communication from the inlet. That is, at a time when the valve pin extension 102 engages the end of shaft 32 adjacent the extension and does not engage the slotted portion 104, the valve pin is urged to the left against the spring 98. However, as soon as the shaft 32 has rotated to where the pin extension 102 engages the slotted portion 104 of the shaft the spring closes the valve on seat 96.

For controlling the oscillating member or sector and consequently the wiping action of the mechanism a throttling valve 106 engages a seat 108 located in the passages 63 and 64 to thereby regulate the fluid pressure acting on one or the other sides of the oscillating member.

I claim:
1. A fluid motor mechanism for oscillating a shaft, comprising an inlet port arranged to be connected to a source of fluid under pressure, an exhaust port, a member secured to the shaft for oscillating the same and having two sides subjected to differential pressure, passages connecting both sides to the inlet port, passages connecting both sides to the exhaust port, and means for controlling the passages so that when one side is connected to the inlet port the other side is disconnected therefrom, and said other side is connected to the exhaust port and said one side is disconnected therefrom, and vice versa, said means including portions disposed in the path of movement of said member to be engaged thereby for movement to periodically and alternately connect first said one side then said other side to the inlet to cause the shaft to be oscillated, a spring actuated element on each side of the member for engaging said portions and constructed and arranged to permit relative movement between said elements and the member, and spring biased balls located toward the ends of the periods of oscillation of said member and constructed and arranged to project into the path of movement of said spring actuated elements to normally engage the same to cause a force to be built up therein which will overcome said spring biased balls, whereby said spring actuated elements are released with a snap action to positively move the said portions to connect one side or the other of said member to the inlet port.

2. A fluid motor mechanism for oscillating a shaft, comprising an inlet port arranged to be connected to a source of fluid under pressure, an exhaust port, an oscillatable member secured to the shaft and having two sides, passages connecting both sides to the inlet port, passages connecting both sides to the exhaust port, and means for controlling the passages so that when one side is connected to the inlet port the other side is disconnected therefrom, and said other side is connected to the exhaust port and said one side is disconnected therefrom and vice versa, said means including portions disposed in the path of movement of said oscillating member to be engaged thereby for movement to periodically and alternately connect first said one side then said other side to the inlet to cause the shaft to be oscillated, a spring actuated element pivoted to each side of the oscillating member for engaging said portions with its free end, and spring biased elements located toward the ends of the periods of oscillation of said member and constructed and arranged to project into the path of movement of said spring actuated elements to normally engage the free ends thereof to cause the same to be moved against their respective springs to build up a force therein which will overcome said spring biased elements, whereby the free ends of said spring actuated elements are released with a snap action to positively move the said portions to connect one side or the other of said member to the inlet port.

BERNHARD ULRICH, Jr.

REFERENCES CITED

The following references are of record in the file of this patent:

UNITED STATES PATENTS

| Number | Name | Date |
|---|---|---|
| 20,842 | Darker | July 6, 1858 |
| 780,195 | Kampmann | Jan. 17, 1905 |
| 2,103,001 | Evans et al. | Dec. 21, 1937 |
| 2,218,719 | Richards | Oct. 22, 1940 |
| 2,265,842 | Kellogg | Dec. 9, 1941 |
| 2,297,381 | Wylie | Sept. 29, 1942 |
| 2,302,232 | MacNeil | Nov. 17, 1942 |